No. 856,411. PATENTED JUNE 11, 1907.
C. P. MAINS.
SECTIONAL PNEUMATIC TIRE.
APPLICATION FILED NOV. 15, 1905.
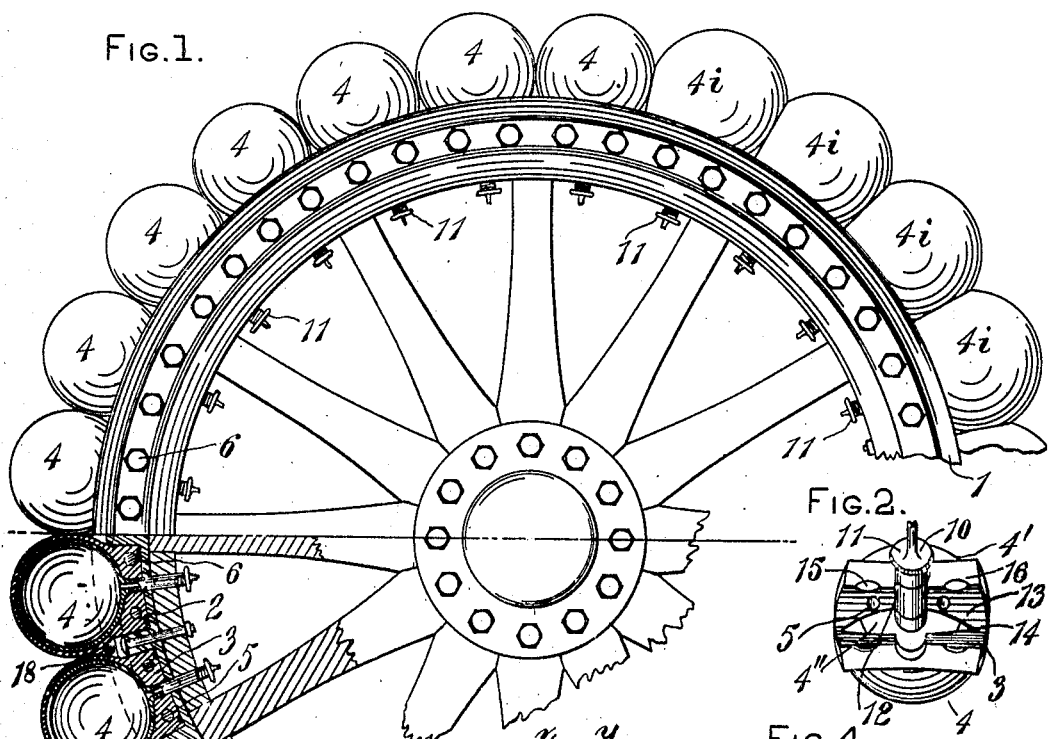
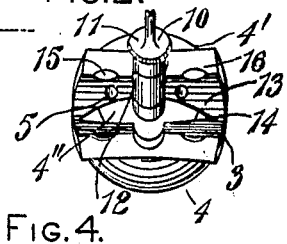
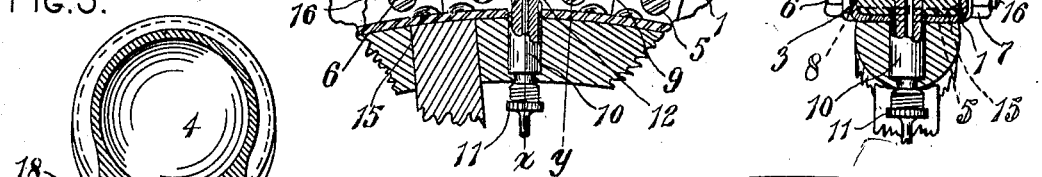
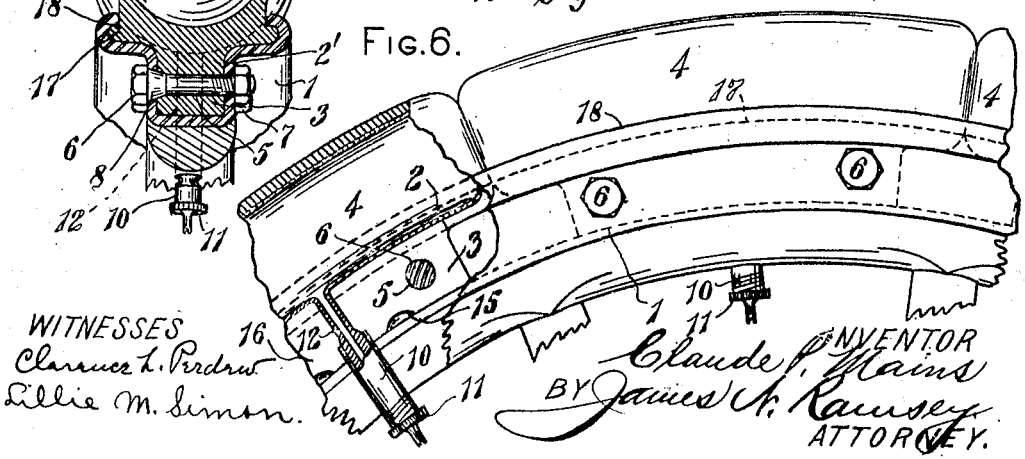

UNITED STATES PATENT OFFICE.

CLAUDE P. MAINS, OF CINCINNATI, OHIO, ASSIGNOR OF ONE-HALF TO GEORGE DEDDENS, OF CINCINNATI, OHIO.

SECTIONAL PNEUMATIC TIRE.

No. 856,411.     Specification of Letters Patent.     Patented June 11, 1907.

Application filed November 15, 1905. Serial No. 287,501.

*To all whom it may concern:*

Be it known that I, CLAUDE P. MAINS, a citizen of the United States, and a resident of Cincinnati, in the county of Hamilton and State of Ohio, have invented certain new and useful Improvements in Sectional Pneumatic Tires, of which the following is a specification.

My invention relates to pneumatic tires and the object is to provide a tire that is not rendered useless by puncturing or other mishap tending to deflate it.

My invention consists of a series of air tight chambers arranged around the periphery of a wheel.

My invention also consists in the parts and in the combination and arrangement of parts as will hereinafter be more fully described and claimed.

In the drawing: Figure 1 represents part of a wheel, partly in elevation and partly is section, provided with my improved tire, some of the chambers being represented as inflated, the double chamber construction being here employed. Fig. 2 is a perspective view of one of the chambers removed from the wheel, showing the arrangement of the parts when the double chamber is used. Fig. 3 is an enlarged section showing a modification. Fig. 4 is a cross section on a line corresponding to x—x of Fig. 3. Fig. 5 is a cross section on a line corresponding to y—y of Fig. 3 showing the single chamber construction. Fig. 6 is a side elevation of a portion of a wheel provided with my improved tire in which the chambers take the form of segments rather than the spheroidal form shown in the preceding figures.

The construction of my improved tire is substantially as follows:

The rim 1 of the wheel is provided with the pockets or depressions 2 as shown in Figs. 1 and 6 or the continuous circumferential groove or depression 2' as shown in Fig. 3. Into the pockets or groove, as the case may be, are inserted the lugs 3 of the chambers 4 preferably formed of rubber. The lugs 3 have bolt holes 5 corresponding with similar holes in the rim 1 and through these holes are inserted bolts having nuts 7 with which they are drawn up to hold the chambers 4 in place. I prefer to provide the bolts 6 with a taper 8 under the head, and to taper the hole 5 in the lug correspondingly, so that when the nut 7 is screwed tight, the chamber will be the more tightly held in place upon the rim. When the pockets 2 are used the lugs 3 are of corresponding length, but when the continuous depression is used the lugs are made to form perfect segments and are allowed to abut as at 9, and their wedgelike shape allows them to be tightly held by the bolts 6. In the drawing I have indicated some of the chambers or sections as being inflated, as indicated at $4^1$.

Each chamber is provided with an inlet tube 10 having the usual check valve therein and this tube 10 is extended through an opening in the rim 1 and provided with a cap 11 as shown.

The double chamber consists of the outer chamber 4' inclosing the inner chamber 4" having its inlet tube 10 extending through the outer chamber at 12. The outer chamber, in order to allow of the insertion and removal of the inner chamber has the mouth 13 in the lug. The corners of this mouth are reinforced as shown at 14 to prevent tearing of the chamber at that point when the mouth is opened. To facilitate the opening of the mouth, suitable recesses 15 are provided which allow of the insertion of any object adapted to pull the lips 16 apart.

In both the single and double chamber construction the chambers have the laterally projecting ribs 17 adapted to engage under the inwardly projecting flange 18 of the rim to assist in holding the chambers in proper position and relieve the lateral strain thereon.

By providing a pneumatic tire made up of separate and distinct air chambers, as herein described, I obviate the necessity of repairing and reinflating the entire tire when it is punctured as is the case with a continuous tire. Especially is this true when a large number of sections are employed, as it will be found that when one of these comparatively small sections or chambers is punctured its efficiency in performing the duties of a pneumatic tire is impaired but little owing to the fact that it is under external pressure only when it, individually, is bearing upon the ground. As the section is small its own elasticity tends to keep it in spherical shape and filled with air at atmospheric pressure. It is difficult to force this air through a puncture of the usual size and as the period of pressure is necessarily short when the wheel is rolling at the usual rate of speed, very little of the air will be forced out of the chamber. With the continuous tire the air within is subjected to a continuous pressure and is consequently soon forced out through the puncture.

While it is possible as above pointed out, to continue the use of the punctured section, it may be readily removed by taking out the bolts, and a new section, already inflated may be bolted in its place. The valve leakage also is reduced to a minimum because the period of pressure upon the section is short, and owing to the comparatively small size of the chamber, a high pressure may be maintained, if desired.

While I have described and shown a particular construction, I do not wish to be understood as limiting myself to it, but What I desire to secure by Letters Patent is:

A sectional pneumatic tire comprising a plurality of spherical chambers 4 each provided with a lug 3 and laterally projecting ribs 17 in combination with pockets 2 and flanges 18 adapted to receive said lugs 3 and ribs 17, respectively, and a bolt 6 having a taper 8 under its head adapted to enter hole 5 and nut 7 screwed thereon whereby said parts are securely held in fixed relation to each other, substantially as and for the purposes set forth.

CLAUDE P. MAINS.

Witnesses:
JAMES N. RAMSEY,
LILLIE M. SIMON.